(12) United States Patent
Kennedy et al.

(10) Patent No.: US 9,682,773 B2
(45) Date of Patent: Jun. 20, 2017

(54) SYSTEMS AND METHODS FOR BLADE ATTACHMENT

(71) Applicant: The Boeing Company, Seal Beach, CA (US)

(72) Inventors: Dennis K. Kennedy, Mesa, AZ (US); Zach Keely Stahlecker, Chandler, AZ (US); Saul Opie, Mesa, AZ (US)

(73) Assignee: THE BOEING COMPANY, Chicago, IL (US)

( * ) Notice: Subject to any disclaimer, the term of this patent is extended or adjusted under 35 U.S.C. 154(b) by 717 days.

(21) Appl. No.: 13/926,295

(22) Filed: Jun. 25, 2013

(65) Prior Publication Data

US 2014/0377073 A1 Dec. 25, 2014

(51) Int. Cl.
*B64C 11/04* (2006.01)
*B64C 27/48* (2006.01)
*B64C 27/473* (2006.01)

(52) U.S. Cl.
CPC ...... *B64C 27/48* (2013.01); *B64C 2027/4736* (2013.01); *Y10T 29/49826* (2015.01); *Y10T 403/7075* (2015.01)

(58) Field of Classification Search
CPC .................................................. B64C 27/48
USPC ..... 403/150, 151, 154; 416/201 A, 205–209, 416/210 R, 210 A, 239
See application file for complete search history.

(56) References Cited

U.S. PATENT DOCUMENTS

| | | | |
|---|---|---|---|
| 3,713,753 A | 1/1973 | Brunsch | |
| 3,765,267 A | 10/1973 | Bourquardez et al. | |
| 4,110,056 A | 8/1978 | Stevenson | |
| 4,244,677 A | 1/1981 | Noehren et al. | |
| 4,534,704 A | 8/1985 | McArdle | |
| 4,568,245 A | 2/1986 | Hibyan et al. | |
| 4,652,210 A | 3/1987 | Leman et al. | |
| 4,892,462 A | 1/1990 | Barbier et al. | |
| 5,074,753 A | 12/1991 | Covington et al. | |
| 5,092,738 A | 3/1992 | Byrnes et al. | |
| 5,222,297 A | 6/1993 | Graff et al. | |
| 5,474,424 A | 12/1995 | Bietenhader et al. | |
| 6,074,126 A | 6/2000 | Hunter et al. | |
| 6,102,610 A | 8/2000 | Palusis et al. | |
| 7,047,596 B2 | 5/2006 | Sucic et al. | |
| 8,122,586 B2 | 2/2012 | Muylaert et al. | |

(Continued)

FOREIGN PATENT DOCUMENTS

| | | |
|---|---|---|
| DE | 3738216 C1 | 6/1989 |
| EP | 0604299 A1 | 6/1995 |
| WO | 2008087443 A1 | 7/2008 |

OTHER PUBLICATIONS

PCT Search Report for related application PCT/US2014/032375 dated Jul. 30, 2014, 12 pp.

(Continued)

*Primary Examiner* — Woody Lee, Jr.

(74) *Attorney, Agent, or Firm* — Armstrong Teasdale LLP

(57) ABSTRACT

Systems and methods for blade attachment are proved. The systems and methods include an aircraft system having a rotor hub including a blade connector and a composite blade including a lug fitting assembly. The lug fitting assembly includes a fitting core including a lug fitting aperture, a lug bushing coupled within the lug fitting aperture, and an outer fitting substantially surrounding the fitting core.

17 Claims, 5 Drawing Sheets

(56) References Cited

U.S. PATENT DOCUMENTS

| | | | | |
|---|---|---|---|---|
| 8,500,407 B1* | 8/2013 | Kennedy | ............... | B64C 27/48 416/209 |
| 2009/0010764 A1* | 1/2009 | Parisy | ................... | B64C 27/48 416/226 |
| 2009/0085351 A1 | 4/2009 | Cloos et al. | | |
| 2010/0278655 A1* | 11/2010 | Kuntze-Fechner | ..... | B64C 27/48 416/230 |
| 2012/0195762 A1* | 8/2012 | Bianchi | .................. | B64C 27/48 416/214 R |
| 2013/0142658 A1* | 6/2013 | Bianchi | .................. | F01D 5/147 416/226 |

OTHER PUBLICATIONS

PCT Search Report, Application No. PCT/US2014/032375, dated Dec. 29, 2015, pp. 7.

* cited by examiner

SYSTEMS AND METHODS FOR BLADE ATTACHMENT

STATEMENT REGARDING FEDERALLY SPONSORED RESEARCH & DEVELOPMENT

This invention was made with Government support under contract number, Phase IV: W911W6-07-D-0002-0020 awarded by the U.S. Army. The government has certain rights in the invention.

BACKGROUND

The field of the disclosure relates generally to composite structures, and more specifically, to methods and systems for reducing bearing stress in a rotating composite blades.

Generally, stresses or loads induced on rotating composite blades due to centripetal force can negatively impact a blade life cycle. Some methods for reducing the stresses imparted on the composite blades can increase weight and aerodynamic drag. There is a need for methods and systems for reducing stresses on composite structures (e.g., rotating blades) that do not substantially increase weight and/or aerodynamic drag.

BRIEF DESCRIPTION

In one aspect, an aircraft system is provided. The aircraft system includes a rotor hub including a blade connector and a composite blade including a lug fitting assembly. The lug fitting assembly includes a fitting core including a lug fitting aperture, a lug bushing coupled within the lug fitting aperture, and an outer fitting substantially surrounding the fitting core.

In another aspect, a method for reducing bearing stress in a composite structure is provided. The method includes providing a composite structure, providing a fitting core coupled to the composite structure, and providing an outer fitting substantially surrounding the fitting core, wherein the outer fitting includes a web portion.

In yet another aspect, an apparatus for reinforcing a joint in a composite material is provided. The apparatus includes a fitting core including a lug fitting aperture, a lug bushing coupled within the lug fitting aperture, and an outer fitting substantially surrounding the fitting core.

The features, functions, and advantages that have been discussed can be achieved independently in various embodiments or may be combined in yet other embodiments, further details of which can be seen with reference to the following description and drawings.

DETAILED DESCRIPTION

The systems and methods described herein facilitate transferring forces from a composite blade and/or blade root to a metallic lug attachment joint through one or more bushings.

Figure 1:
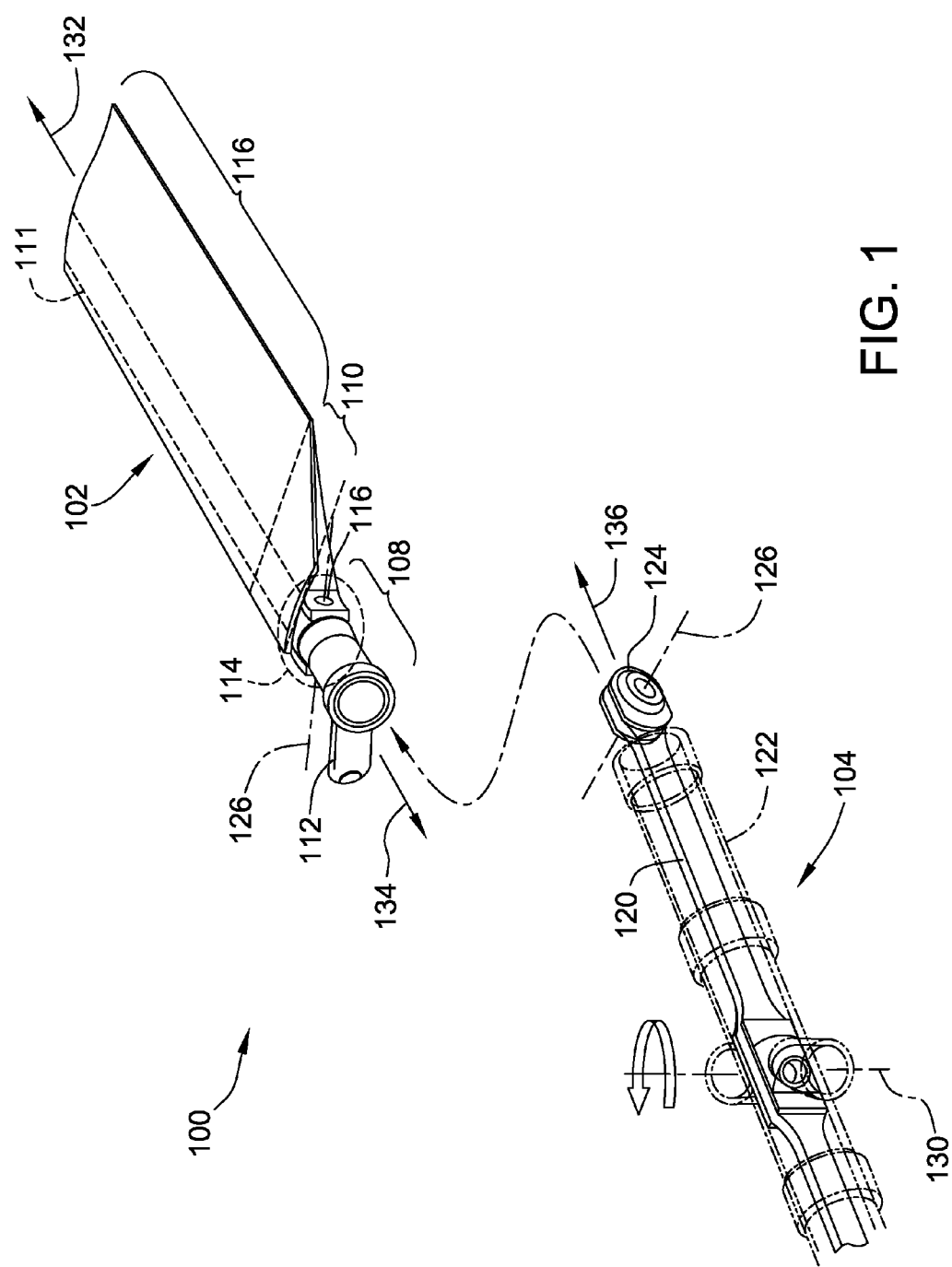
FIG. 1 is an illustration of an exemplary blade system for use with an aircraft.

FIG. 1 is an illustration of an exemplary blade system 100 for use with an aircraft. As used herein, the term "aircraft" may include, but is not limited to only including, airplanes, unmanned aerial vehicles (UAVs), gliders, helicopters, and/or any other object that travels thorough airspace. In the exemplary embodiment, blade system 100 is configured for use with a helicopter. Alternatively, blade system 100 can be configured for use with any system requiring the use of a blade, including, but not limited to, aircraft and wind turbines. Blade system 100 includes a rotor blade 102 and a rotor hub 104. In the exemplary embodiment, rotor blade 102 is a composite helicopter rotor blade including a carbon epoxy composite braided and Resin Transfer Molded (RTM) laminate. Alternatively, rotor blade can be fabricated from any material that facilitates providing thrust. Rotor blade 102 includes a blade airfoil section 106, a blade root 108, and a root transition section 110 positioned between airfoil section 106 and blade root 108. Blade root 108 is formed to be integral with a blade spar assembly 111. Rotor blade 102 also includes a pitch control device 112 and a blade lug attachment section 114 having a lug attachment joint (shown in more detail below) with a lug aperture 116. Rotor hub 104 includes a hub strap pack 120, a hub section 122, and a blade connector 124.

Rotor hub 104 is configured to couple to rotor blade 102 by coupling blade connector 124 to blade lug attachment section 114 by a lug attachment (not shown) through axis 126. In the exemplary embodiment, lug attachment is a lug bolt, however, the lug attachment can be any attachment apparatus that facilitates coupling blade 102 to hub 104, including, but not limited to, a preload clamping bushing, a pin-type joint, a bushing, a lug bolt assembly, an axle, and a cotter pin. In the exemplary embodiment, when coupled together, rotor blade 102 and rotor hub 104 are configured to rotate about axis 130 to generate thrust. In operation, rotor blade 102 generates a centrifugal force 132 as it rotates which causes a root end reaction force 134 and thereby a hub reaction force 136. Hub reaction force 136 may cause composite bearing stresses in lug attachment joint and lug aperture 116. As described in more detail below, the lug attachment joint of the disclosure is configured reduce and/or redistribute these composite bearing stresses. In one implementation, strap pack 120 is configured to absorb reaction force 136 resulting from centrifugal force 132.

Figure 2:
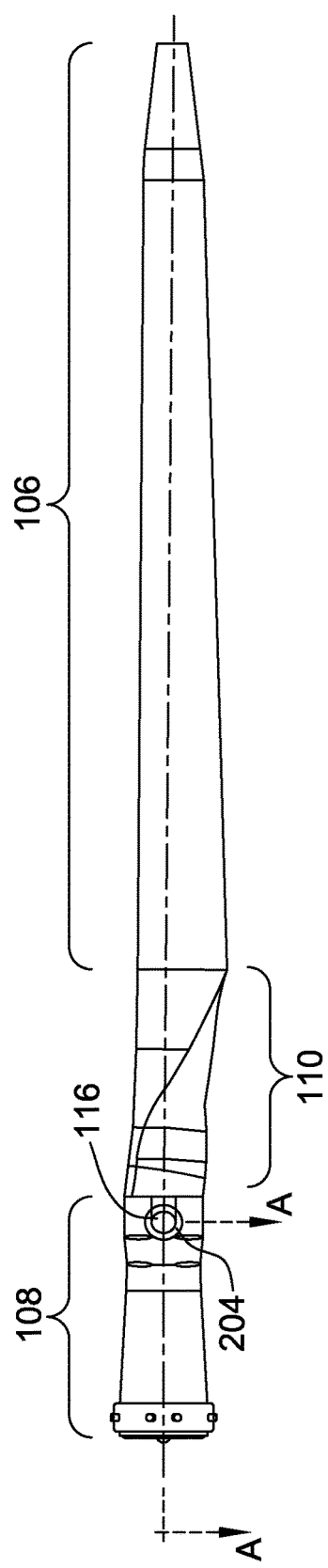
FIG. 2 is a side perspective view of the blade shown in FIG. 1.
Figure 3:
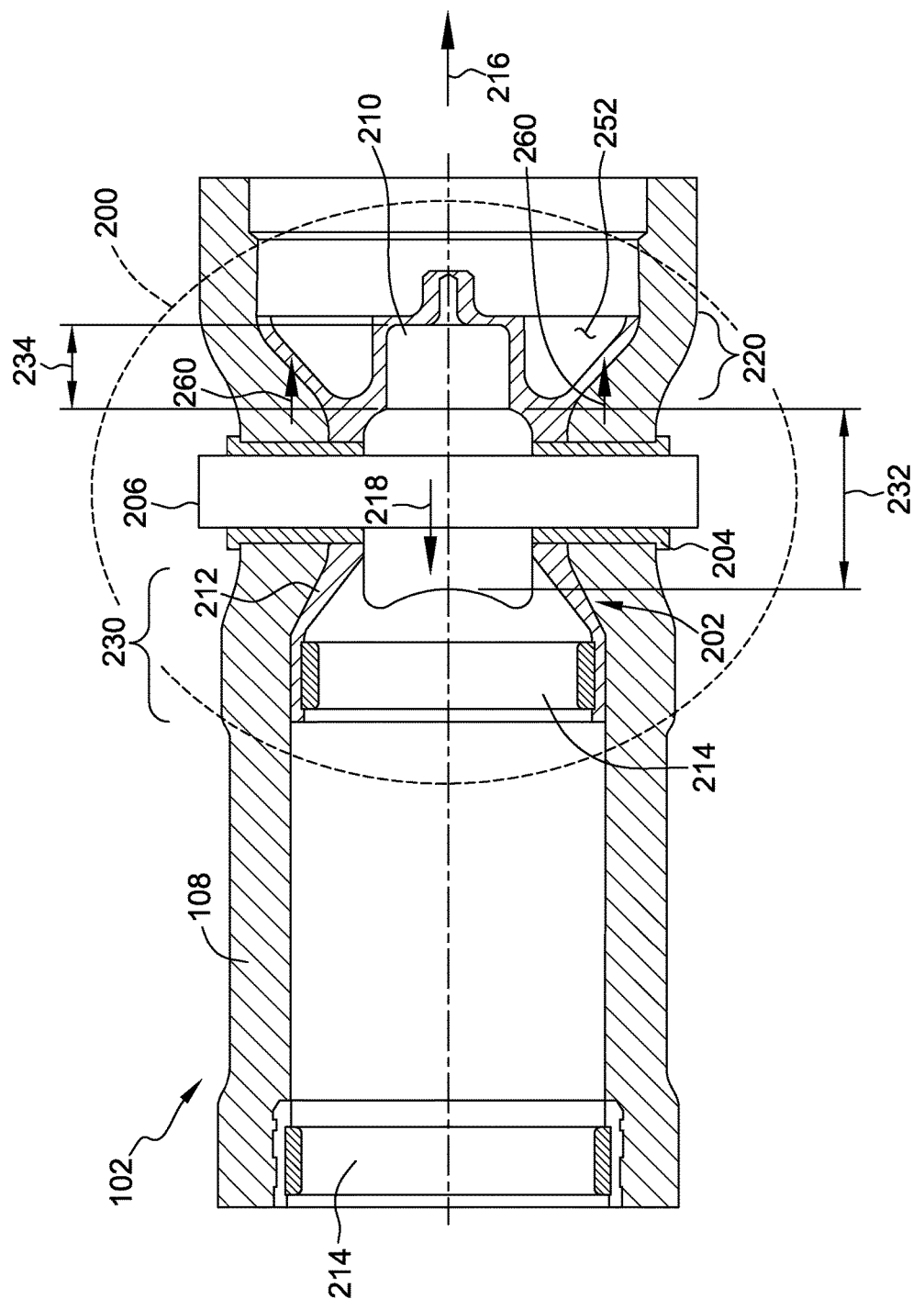
FIG. 3 is a sectional view of the blade shown in FIG. 2.

FIG. 2 is a side perspective view of blade 102 shown in FIG. 1 and FIG. 3 is a sectional view of a blade 102 (shown in FIG. 2) taken along line A-A. Blade 102 includes a lug attachment joint 200 coupled into blade root 108. Attachment joint 200 includes a lug fitting assembly 202, a lug bushing 204, and a lug attachment 206. In the exemplary embodiment, lug bushing 204 is coupled within blade root 108 and lug aperture 116 of fitting assembly 202. Fitting assembly 202 is coupled or attached to lug bushing 204 to reinforce blade root 108 against bearing stresses. In the exemplary embodiment, bushing 204 is coupled to assembly 202 via cold working. Alternatively, bushing 204 can be coupled to assembly 202 in any manner that facilitates reducing stress on blade 102 including, but not limited to, diffusion bonding, super plastic diffusion bonding, welding, and/or soldering. In the exemplary embodiment, bushing 204 and assembly 202 are fabricated from materials that have compatible Coefficient of Thermal Expansion (CTE) characteristics to provide intimate fit and contact to ensure shared load transfer after cure. In some embodiments, at least one of bushing 204 and assembly 202 is fabricated from at least a metal, including, but not limited to, titanium and corrosion-resistant steel (stainless steel). In operation, as a centrifugal load (CF) or axial load 216 is created, bushing 204 provides a substantially uniform load transfer path 218 of bearing stress from lug attachment 206 on bushing 204, thereby protecting blade root 108 from bearing stresses induced thereupon.

In the exemplary embodiment, lug fitting assembly 202 includes a fitting core 210 that is coupled and/or integrated with an outer fitting 212. Fitting core 210 includes features configured to receive pitch bearings 214. Pitch bearings 214 provide a reaction point for blade 102 bending moments. Pitch bearings 214 also enable root end 108 and thus the rotor blade 102 to change pitch. In one embodiment, root end 108 is coupled to assembly 202 by pitch bearings 214.

Figure 4:
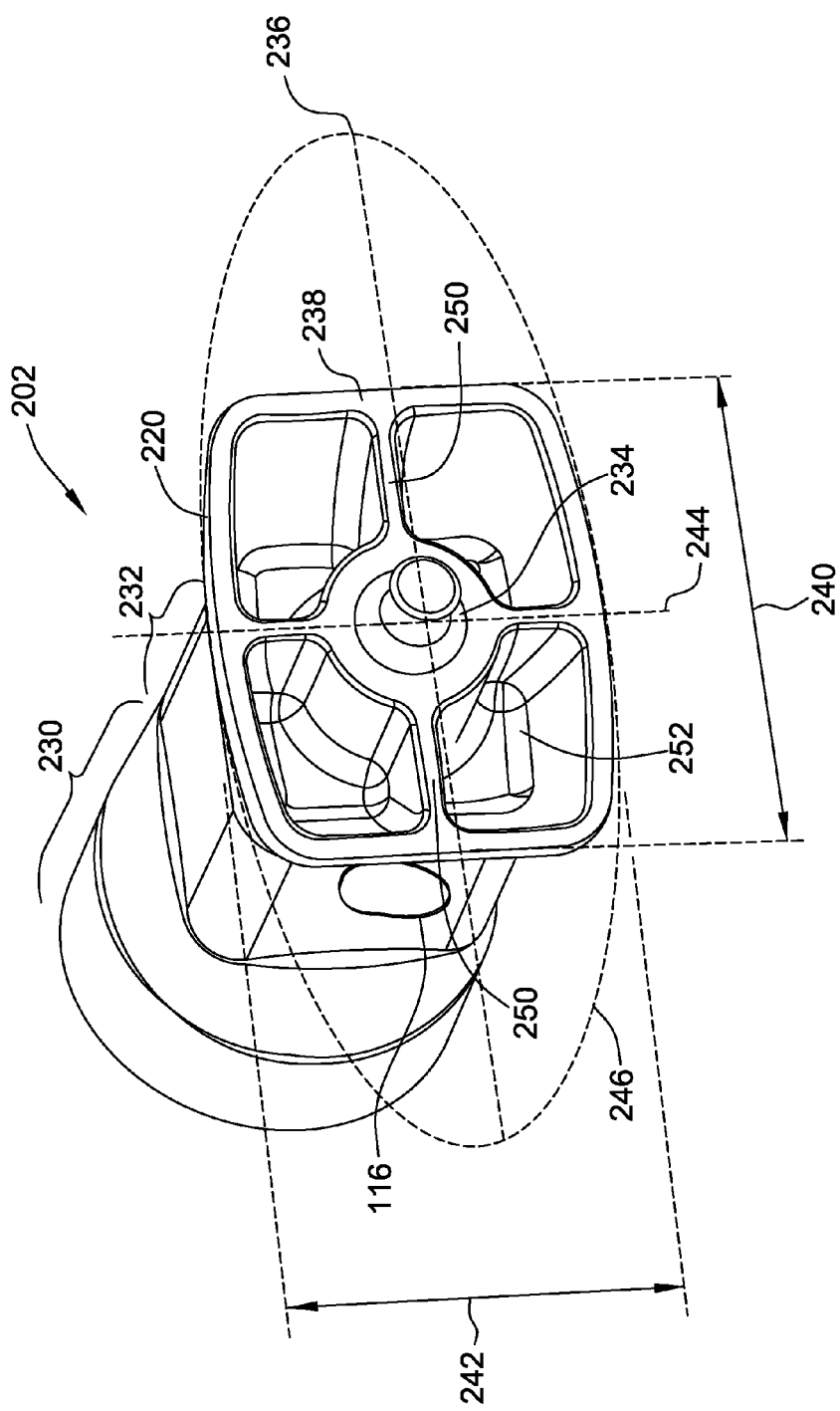
FIG. 4 is a perspective view of the lug fitting assembly shown in FIG. 3.

FIG. 4 is a perspective view of lug fitting assembly 202 (shown in FIG. 3). Outer fitting 212 substantially surrounds fitting core 210 and includes a web portion 220. In the exemplary embodiment, fitting core 210 includes a first section 230, a second section 232, and a third section 234. First section 230 is substantially conical and configured to couple to pitch bearing 214. First section 230 has a diameter of about 2.375 inches. Second section 230 is substantially square and includes lug aperture 116 formed therein to enable bushing 204 to be coupled within aperture 116. Second section 232 has an inscribed diameter of about 1.8 inches. Third section 234 is substantially cylindrical, is coupled to second section 232, and has a diameter of about 1.08 inches. Alternatively, sections 230, 232, and 234 can have any size and shape that facilitates load transfer as described herein.

In the exemplary embodiment, web portion 220 extends outward from third section 234 in a chordwise direction 236 to form a truncated ellipse. In the exemplary embodiment, a web portion face 238 has a length 240 in chordwise direction 236 of about 2.88 inches. As such, length 240 extends further in chordwise direction 236 than any of sections 230, 232, and 234. Web portion face 238 has a length 242 in a flapwise direction 244 of about 2.27 inches. Web portion face 238 defines an ellipse 246 having an eccentricity of 0.904. As such, web 220 has a depth of 1.25 inches. Alternatively, web portion 220 can have any length 240, height 242, depth, and eccentricity that facilitates load distribution as described herein.

Web portion 220 includes a plurality of web supports 250 extending outward from third section 234. Web supports 250 are configured to create cavities 252 defined between adjacent supports 250. In the exemplary embodiment, web portion 220 includes four web supports 250 forming four cavities 252. Alternatively, web portion 220 can include any number of web supports 250 forming any number of cavities. The use of web supports 250 provide buckling and/or collapse resistance of web portion 220 under load. Web supports 250 also reduce a thickness and number of composite plys required at lug aperture 116 to provide sufficient strength. The reduction of composite plys at lug aperture 116 reduces a number of plys needed for support in blade root 108 enabling blade 102 to have a lower weight and reduce aerodynamic drag.

In operation, assembly 202 provides a second load path 260 configured to absorb reaction force 136 resulting from centrifugal force 132. The truncated elliptical geometry shape of web portion 220 provides a means of rapid transition (inboard-to-outboard) from second section 232 at aperture 116 into a blade airfoil shape outboard lug attachment 206. Elliptical shape 246 defined by web portion 220 with a major axis in chordwise direction 236 enables loads to be biased in a chordwise plane 236 as opposed to a flapwise plane 244. As such, web portion 220 allows a uniform geometric transition from a basic shape (e.g., square or cylindrical) into an elliptical shape.

Figure 5:
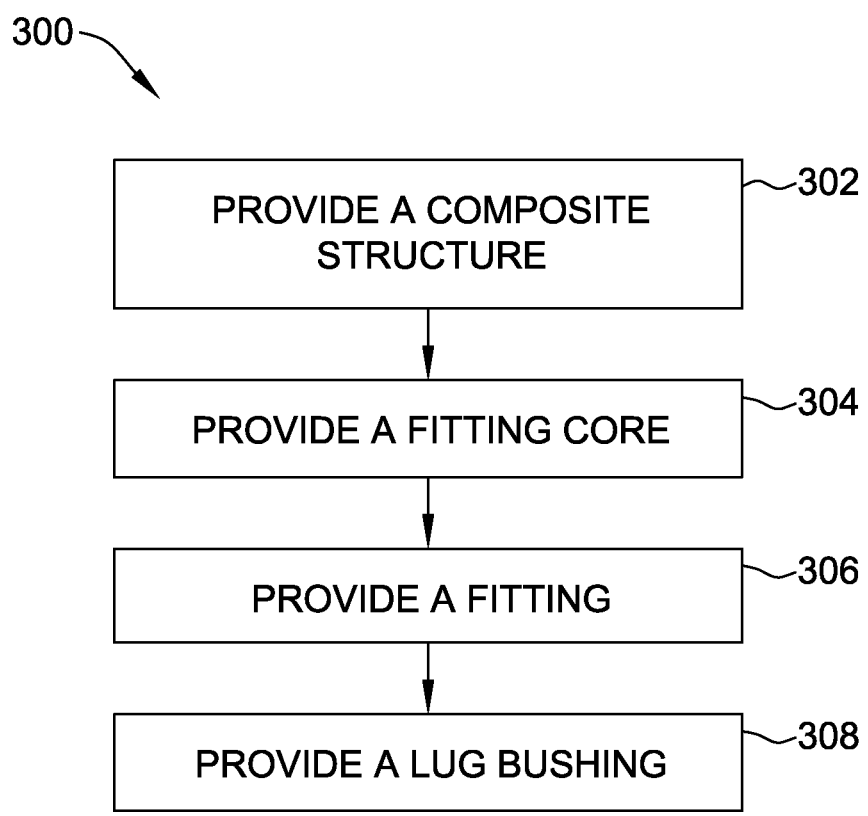
FIG. 5 is a flowchart of an exemplary method that may be implemented using the blade shown in FIG. 1.

FIG. 5 is a flowchart of an exemplary method 300 for reducing bearing stress in a composite structure, such as blade 102 shown in FIG. 1. Method 300 includes providing 302 a composite structure. In the exemplary embodiment, the composite structure is a blade, such as blade 102. A fitting core 210 coupled to the composite structure is provided 304. Method 300 also includes providing 306 an outer fitting 212 that substantially surrounds fitting core 210. In the exemplary embodiment, outer fitting 212 includes web portion 220. Additionally, lug bushing 204 is provided 308 and coupled within fitting core 210. In some embodiments, providing 306 outer fitting 212 includes providing 306 outer fitting 212 such that bearing stress is distributed in predetermined amount in web portion 220 by tailoring a width to thickness ratio and spanwise depth of web portion 220.

The embodiments described herein facilitate transferring forces or bearing stresses from a composite blade and/or blade root to a metallic lug attachment joint through one or more bushings. The fitting described herein includes a web portion having web supports that perform necessary load carrying functions enabling a blade to require fabrication using less plys around a lug attachment for support. The reduction of plys in a blade enables the blade to achieve a low aerodynamic drag while achieving a reduced weight. The use of a web portion and web supports also provides a higher fatigue life and reduces manufacturing and assembly costs of a blade.

Although specific features of various embodiments of the invention may be shown in some drawings and not in others, this is for convenience only. In accordance with the principles of the invention, any feature of a drawing may be referenced and/or claimed in combination with any feature of any other drawing. Although aircraft have been used as an example throughout, it is contemplated that other implementations, such as electric or motor vehicles, maritime vehicles, spacecraft, and/or turbines may be used with the methods and systems described herein.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An aircraft system comprising:
   a rotor hub comprising a blade connector; and
   a composite blade including a lug fitting assembly, said lug fitting assembly comprising:
   a fitting core including a lug fitting aperture;
   a lug bushing coupled to and extending from said fitting core, said lug bushing coupled within said lug fitting aperture; and
   an outer fitting coupled to and surrounding said fitting core, wherein said outer fitting includes a web portion coupled thereto such that said web portion extends obliquely away from said fitting core, wherein said web portion includes a plurality of web supports.

2. The aircraft system according to claim 1, wherein said plurality of web supports form a plurality of cavities.

3. The aircraft system according to claim 1, wherein said web portion forms a truncated ellipse.

4. The aircraft system according to claim 1, wherein said lug bushing is configured to provide a first load transfer path.

5. The aircraft system according to claim 1, wherein said outer fitting is configured to provide a second load transfer path.

6. The aircraft system according to claim 1, further comprising a lug attachment configured to couple said rotor hub to said composite blade.

7. The aircraft system according to claim 6, wherein the lug attachment is at least one of a preload clamping bushing, a pin-type joint, a bushing, a lug bolt, a lug bolt assembly, an axle, and a cotter pin.

8. The aircraft system according to claim 1, wherein said composite blade includes a root end.

9. The aircraft system according to claim 8, wherein said lug fitting assembly is coupled within said root end.

10. The aircraft system according to claim 1, wherein at least a portion of said outer fitting has a chordwise length of at least 2 inches.

11. The aircraft system according to claim 1, wherein said outer fitting includes a first section, a second section coupled to said first section, and a third section coupled to said second section, wherein said web portion extends from said third section.

12. The aircraft system according to claim 11, wherein said first section is substantially conical, said second section is substantially square, and said third section is substantially cylindrical.

13. An apparatus for reinforcing a joint in a composite material, the apparatus comprising:
a fitting core including a lug fitting aperture;
a lug bushing coupled to and extending from said fitting core, said lug bushing within said lug fitting aperture; and
an outer fitting coupled to and surrounding said fitting core, wherein said outer fitting includes a web portion coupled thereto such that said web portion extends obliquely away from said fitting core, wherein said web portion includes a plurality of web supports.

14. The apparatus according to claim 13, wherein said lug bushing is configured to provide a first load transfer path.

15. The apparatus according to claim 13, wherein said outer fitting is configured to provide a second load transfer path.

16. A method for reducing bearing stress in a composite structure, the method comprising:
providing a composite structure;
providing a fitting core including a lug fitting aperture coupled to the composite structure;
providing a lug bushing coupled to and extending from said fitting core, said lug bushing coupled within said lug fitting aperture; and
providing an outer fitting coupled to and surrounding the fitting core, wherein the outer fitting includes a web portion coupled thereto such that said web portion extends obliquely away from said fitting core, wherein the web portion includes a plurality of web supports.

17. The method according to claim 16, wherein providing an outer fitting further comprises providing an outer fitting such that bearing stress is distributed in predetermined amount in the web portion by tailoring the width to thickness ratio of the web portion.

* * * * *